US012235746B2

(12) United States Patent
Anurag et al.

(10) Patent No.: US 12,235,746 B2
(45) Date of Patent: Feb. 25, 2025

(54) INTERFACE MECHANISM TO CONTROL AND ACCESS INSTRUMENT SETTINGS AND INSTRUMENT DATA

(71) Applicant: Tektronix, Inc., Beaverton, OR (US)

(72) Inventors: K T Anurag, Bengaluru (IN); Nitin Khaneja, Bengaluru (IN); Akshay Mishra, Bengaluru (IN); K Vani, Bengaluru (IN)

(*) Notice: Subject to any disclaimer, the term of this patent is extended or adjusted under 35 U.S.C. 154(b) by 0 days.

(21) Appl. No.: 18/100,180

(22) Filed: Jan. 23, 2023

(65) Prior Publication Data

US 2023/0236943 A1 Jul. 27, 2023

(30) Foreign Application Priority Data

Jan. 25, 2022 (IN) ............................. 202221004291

(51) Int. Cl.
*G06F 11/00* (2006.01)
*G06F 9/54* (2006.01)
*G06F 11/27* (2006.01)

(52) U.S. Cl.
CPC .............. *G06F 11/27* (2013.01); *G06F 9/547* (2013.01)

(58) Field of Classification Search
CPC ................................. G06F 11/27; G06F 9/547
USPC ....................................................... 714/1–57
See application file for complete search history.

(56) References Cited

U.S. PATENT DOCUMENTS

| | | | | |
|---|---|---|---|---|
| 11,443,382 B1* | 9/2022 | Bueche, Jr. | ............ | G06Q 10/10 |
| 2003/0188227 A1* | 10/2003 | Maison | ............... | G06F 11/0763 |
| | | | | 714/45 |
| 2004/0078667 A1* | 4/2004 | Salem | .................. | G06F 11/079 |
| | | | | 714/E11.026 |
| 2005/0034019 A1* | 2/2005 | Mayer | ................. | G06F 11/2294 |
| | | | | 714/25 |
| 2005/0114467 A1* | 5/2005 | Ikegaya | ............... | G06F 11/3006 |
| | | | | 709/217 |
| 2005/0223048 A1* | 10/2005 | Smith | ..................... | G06F 9/466 |
| 2012/0023506 A1* | 1/2012 | Maeckel | ................. | G06F 9/485 |
| | | | | 709/227 |
| 2015/0220378 A1* | 8/2015 | Kanamaru | ............ | G06F 11/263 |
| | | | | 714/37 |
| 2015/0278021 A1* | 10/2015 | Crisan | ................. | G06F 11/1072 |
| | | | | 714/6.24 |
| 2016/0041887 A1* | 2/2016 | Davis | .................. | G06F 11/1072 |
| | | | | 714/6.2 |
| 2017/0251014 A1* | 8/2017 | Eisen | ................. | G06Q 20/4016 |
| 2018/0024896 A1* | 1/2018 | Yamabiraki | ......... | G06F 11/2048 |
| | | | | 714/12 |

(Continued)

*Primary Examiner* — Sarai E Butler

(74) *Attorney, Agent, or Firm* — Miller Nash LLP; Andrew J. Harrington; Krista Y. Chan

(57) ABSTRACT

A test and measurement system includes an instrument having an input port structured to receive an input signal from a Device Under Test (DUT), a memory structured to store data derived from the input signal, a remote access manager, and an instrument state manager structured to maintain a present operating state of the instrument. The system further includes a remote device structured to receive through a communication network at least a portion of the stored data derived from the input signal from the instrument, and further structured to receive a transaction identifier that identifies the present operating state of the instrument when the portion of the stored data was acquired by the instrument. Methods are also described.

20 Claims, 4 Drawing Sheets

(56) References Cited

U.S. PATENT DOCUMENTS

| | | | |
|---|---|---|---|
| 2018/0196693 A1* | 7/2018 | Moothoor | G06F 9/445 |
| 2021/0191398 A1* | 6/2021 | Chen | G05D 1/0022 |
| 2022/0138065 A1* | 5/2022 | Secatch | G06F 3/0679 |
| | | | 714/6.12 |
| 2022/0365867 A1* | 11/2022 | Deza | G06F 11/3664 |

* cited by examiner

INTERFACE MECHANISM TO CONTROL AND ACCESS INSTRUMENT SETTINGS AND INSTRUMENT DATA

CROSS-REFERENCE TO RELATED APPLICATIONS

This disclosure claims benefit of Indian Provisional Application No. 202221004291, titled "INTERFACE MECHANISM TO CONTROL AND ACCESS INSTRUMENT SETTINGS AND INSTRUMENT DATA," filed on Jan. 25, 2022, the disclosure of which is incorporated herein by reference in its entirety.

TECHNICAL FIELD

The present disclosure relates to an interface mechanism to access to instrument data along with its settings control from host computing device or remote computing device.

BACKGROUND

Standard Commands for Programmable Instruments (SCPI) is a programming language standard designed for controlling test and measurement instruments. SCPI is an American Standard Code for Information Interchange (ASCII)-based instrument command language having SCPI commands that are an ASCII-based set of pre-defined commands and responses, which are sent and received from/to a test and measurement instrument over a physical communication layer. SCPI generally defines how to communicate with the instruments from an external computer using the ASCII-based instrument command language designed for the test and measurement instruments.

Traditional interfaces provide the settings and data access using SCPI over a Local Area Network (LAN). However, because SCPI is an ASCII-based instrument command language, setting up a communication interface between an instrument and a remote device takes a relatively long time, due to the SCPI protocol requiring sending a series of strings of ASCII information down the physical interface. Parsing the SCPI commands is also required to be performed inside the instrument, which also slows the time of not only setting up a communication channel with an instrument, but also retrieving information stored on the instrument. The total time to handle such transfers can increase overheads associated with every individual data transmission, even when using a high-speed LAN and the latest generation of processors, neither of which are the bottleneck. Instead, it is the requirements in the SCPI protocol itself that causes such delays in present systems.

Embodiments according to the disclosure address these and other limitations of the present state of the art.

BRIEF DESCRIPTION OF ACCOMPANYING DRAWINGS

The above and other aspects, features, and advantages of certain exemplary embodiments of the present invention will be more apparent from the following description taken in conjunction with the accompanying drawings.

DETAILED DESCRIPTION

Embodiments according to the disclosure provide an interface to reduce total test time when using a remote instrument by retargeting the instrument data analysis in a local/edge/cloud computing environment, outside the instrument. The interface enables clients to add or modify instrument data by allowing the use of analysis and visualization tools for debugging as well as visualization.

Figure 1:
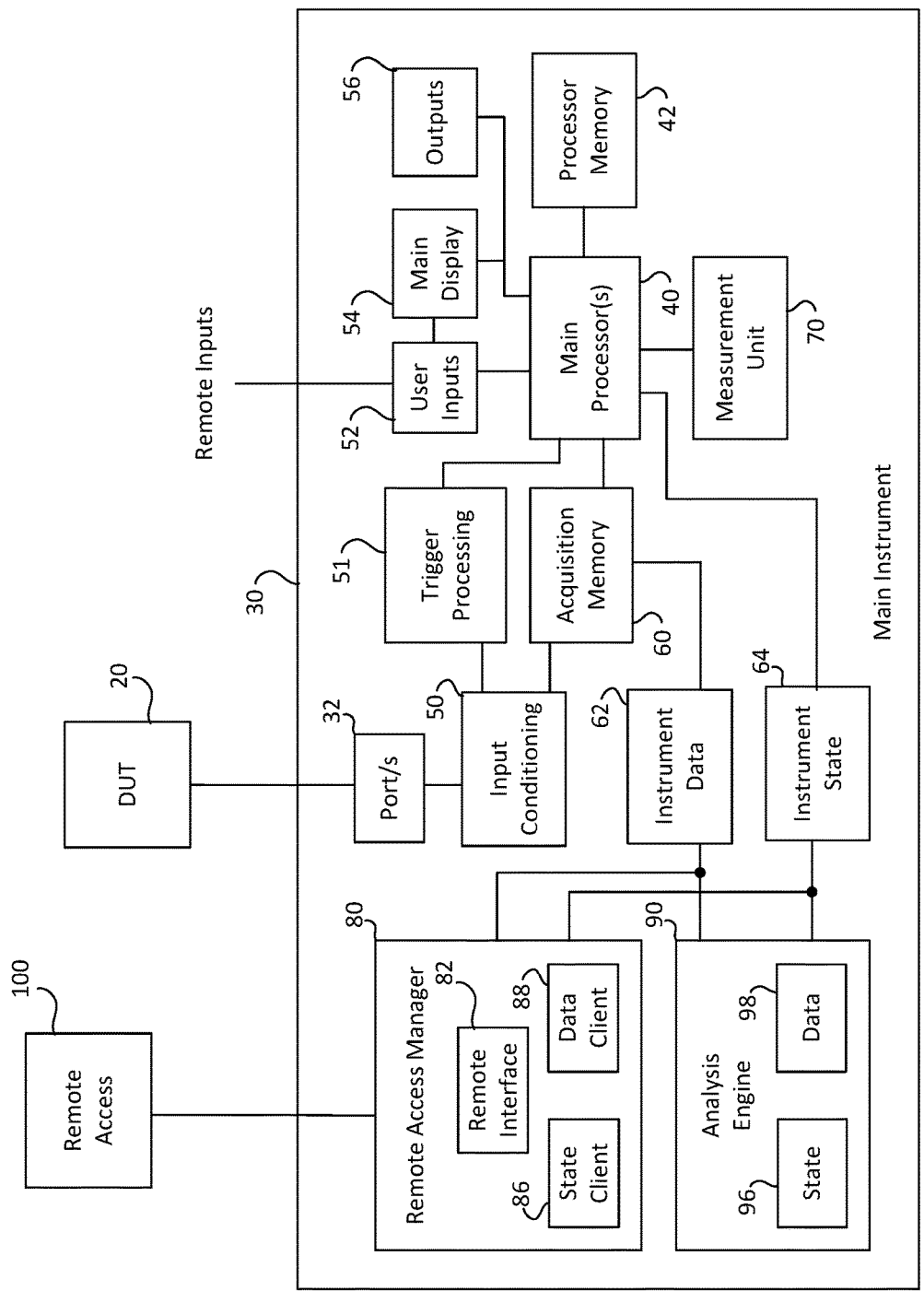
FIG. 1 is a block diagram of an instrument including a resident remote interface for interfacing with a remote device, according to embodiments of the disclosure.

FIG. 1 is a block diagram of an instrument 30 including a resident remote access manager 80 for interfacing with a remote device 100, according to embodiments of the disclosure. In general, the instrument 30 may be any instrument that receives and input signal from an external device and, optionally, performs analysis on the received input signal. Example instruments include oscilloscopes, spectrum analyzers, data network analyzers, and logic analyzers, although embodiments according to the disclosure may operate on other types of devices as well. The instrument 30 includes one or more main processors 40, which is coupled to processor memory 42, which may include RAM, ROM, and/or and cache memory. The processor memory 42 may store instructions for the one or more processors 40, as well as data used by the instrument 30. The stored data may include digitized values representative of the input signal, timebase calibration values, look-up tables and the like. In some embodiments the digitized values representative of the input signal may be stored as a sampled waveform in an acquisition memory 60, which receives the samples from a Device Under Test (DUT) 20. The acquisition memory 60 is also coupled to the one or more processors 40, so the contents stored therein are available to other components, such as measurement unit 70, which form part of the instrument 30. The measurement unit 70 may be one or more separate circuits or modules and can include any component capable of measuring aspects (e.g., voltage, amperage, amplitude, energy, etc.) of a signal received from the DUT 20.

User inputs 52 and user outputs 56 are coupled to the processor 40. The user inputs 52 may include a keyboard, mouse, touchscreen, and/or any other controls employable by a user to set up and control the instrument 30. The user inputs 52 may be embodied by a graphical user interface and/or text/character interface operated in conjunction with a main display 54. The user inputs 52 may further include programmatic inputs from the user on the instrument 30, or from a remote device. The main display 54 may be a digital screen, a cathode ray tube-based display, or any other monitor to display waveforms, measurements, and other data to a user. The user outputs 56 may include test data and other results that may or may not be displayed on the main display 54.

While the components of the instrument 30 are depicted as being integrated within the test and measurement instrument, it will be appreciated by a person of ordinary skill in the art that any of these components can be external to instrument 30, such as in a remote head or in another device, and can be coupled to test instrument 30 in any conventional manner (e.g., wired and/or wireless communication media and/or mechanisms).

The instrument 30 may be coupled to the DUT 20 and receives one or more signals from the DUT 20 for processing and analysis by the instrument. The input signal from the DUT 20 is received at one or more ports 32, which may be any electrical or optical signaling medium. The ports 32 may include receivers, transmitters, and/or transceivers. Each port 32 is a channel of the test and measurement instrument 30. The input signal received at the ports 32 is initially conditioned through a conditioning circuit 50, which may also perform a sampling function to create a sampled waveform from the input signal from the DUT 20. The conditioning circuit 50 may include one or more amplifiers, Analog to Digital Converters (ADCs), and other circuits to create the sampled waveform. The samples are stored in the acquisition memory 60, which was described above. The samples may also be sent to a trigger processor 51, which works in conjunction with the input conditioning circuit 50 to generate a subsequent sample for the sampled waveform. An input signal from the DUT 20 may be sampled thousands, millions, or billions of times to create the sampled waveform stored in the acquisition memory 60 for later use by the instrument. In addition to being used by the instrument, embodiments of the invention include an interface mechanism that allows a user to not only access data stored in the instrument 30, but also to control and modify such data from a remote device in addition to being able to perform external processing on the retrieved data.

The remote access manager 80 manages remote access of data stored in the acquisition memory 60 or elsewhere on the instrument 30 from a remote device 100 that is separate from the instrument itself. Note that this remote data access described herein is different than any remote access performed through the user input 52 or output 56, which, as described above, may be a very slow method of retrieving data from the instrument 30.

The remote access manager 80 includes a remote interface 82, which, as described below, is a main remote interface to interact with the instrument 30 using the new methods described herein. The remote access manager 80 also includes a state client 86 and a data client 88. The state client 86 interfaces with an instrument state function 64, which, in turn, is coupled to the main processor 40 to determine the present state of the instrument. Then the state client 86 stores the present state of the instrument so that it may be accessed by the remote access manager 80, and further to the remote device 100. Similarly, the data client 88 interfaces with an instrument data function 62, which in turn interfaces with the acquisition memory 60, or other memory of the instrument 30, and thus has access to the data stored in the acquisition memory 60 or elsewhere on the instrument 30. In some embodiments, the instrument state function 64 is not a separate element of the instrument 30, and instead the state client 86 of the remote access manager 80 interfaces directly with the main processor 40 to retrieve or update state information. Also similarly, the instrument data function 62 need not be a separate function, or module of the instrument 30 and instead the data client 88 interfaces directly with the acquisition memory 60 of the instrument 30, or elsewhere in the instrument to retrieve, and possibly update data stored in the acquisition memory.

The instrument 30 according to embodiments also includes an analysis engine 90, which is described in detail below.

Figure 2:
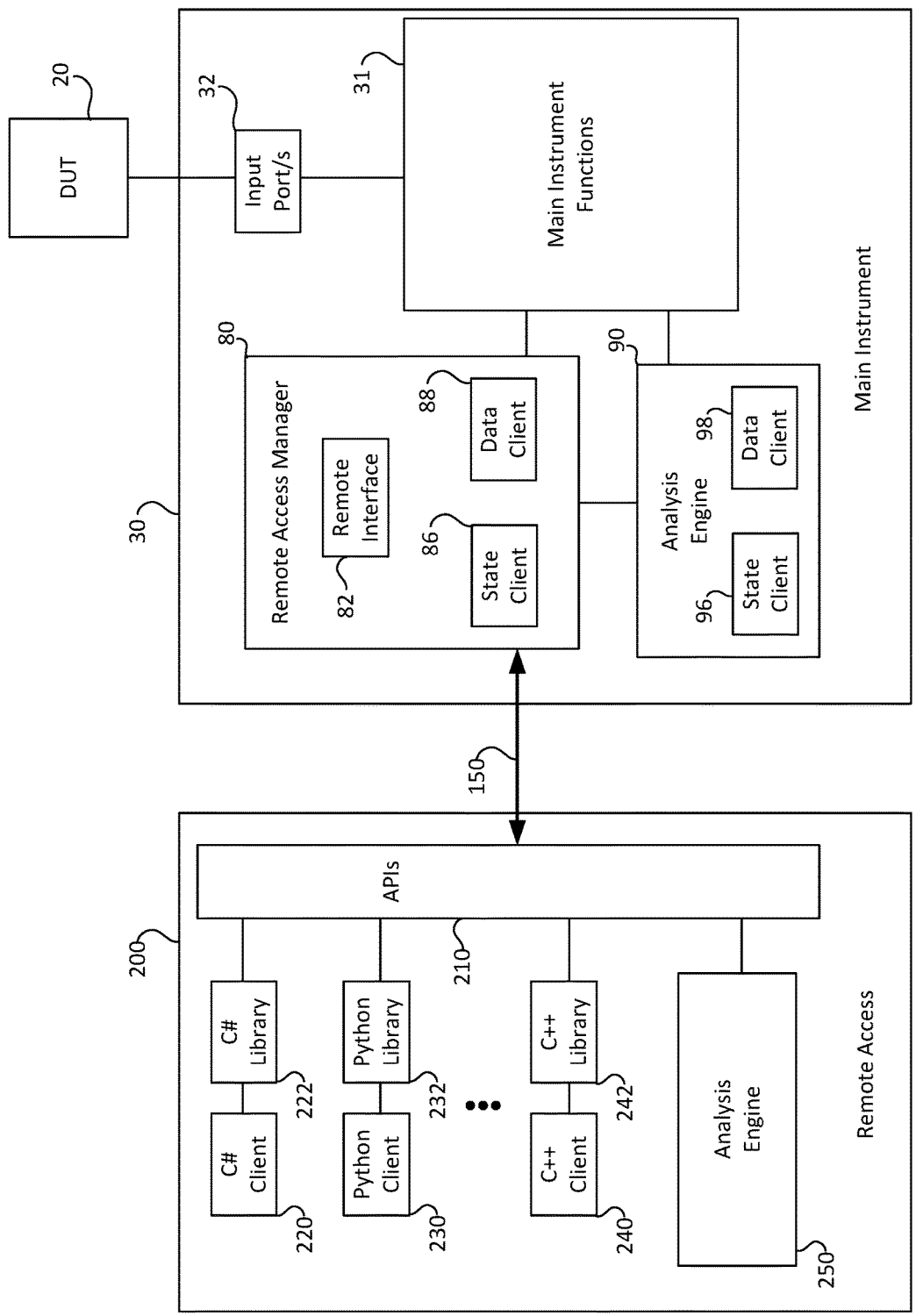
FIG. 2 is a block system diagram including the instrument of FIG. 1 as well as a remote access device that includes library integration with at least one toolset, according to embodiments of the disclosure.

FIG. 2 is a block system diagram including the main instrument 30 of FIG. 1 as well as a remote access device 200 that includes library integration with at least one toolset, according to embodiments of the disclosure. The remote access device 200 may be an embodiment of the remote access device 100 described with reference to FIG. 1. In FIG. 2, the instrument functions described above with reference to FIG. 1 are consolidated into a main reference 31, for clarity.

The remote access device 200 is an interface mechanism that includes a data access subsystem to provide high speed access to instrument state and instrument data for external clients. The remote access device 200 may be used as an interface to the instrument 30, or the functions of the remote access device 200 may be integrated into an external device that allows such an external device to directly interact with the instrument 30. As described above, the remote access device 200 interfaces directly with the remote access manager 80 on the instrument 30 itself. The remote access device 200 need not be a separate, physical, device, but may be embodied as a 'plug-in' of operations that work in conjunction with a host processor to provide a high-speed subsystem plug-in to any remote computing device that wishes to connect to an instrument 30.

In any type of embodiment, the remote access device 200 includes clients, which are typically software clients, that interface with an API (Application Program Interface) to communicate with the remote access manager 80 resident on the instrument 30. Similar to the remote access device 200, the remote access manager 80 need not be separate hardware that operates on the instrument 30 but may be embodied in software as a series of operations processed by the main processor(s) 40 used to interface between the remote access device 200 and the instrument 30. As detailed above, the remote access manager 80 has access to the state of the instrument 30 through the state client 86, and also has access to the data stored in the instrument 30 through the data client 88. Using embodiments according to the disclosure, a user of the remote access device 200 can retrieve the instant operating state of the instrument 30, as well as retrieve data from the instrument 30 in such a state, such as from the acquisition memory 60. Also, as described below, the user of the remote access device 200 can also send commands to control the state of the instrument 30 and determine that the instrument 30 has progressed to the state directed by the user of the remote access device 200. Detailed examples are provided below.

The remote access device 200 includes one or more clients, such as a C # client 220, Python client 230, and C++ client 240. Other clients are possible, which is illustrated by the ellipsis in FIG. 2. Coincident with each client is a client library. For example, a C # library 222 may be provided to support the C # client 220. The C # library 222 may include subroutines, which may or may not be compiled code, that the C # client 220 can access. In this way, the C # client 220 need not be developed from scratch, but may take advantage of the C # library 222. Libraries 222, 232, 242 may be Remote Procedure Call (RPC) Libraries, the functions of which are described below. Other examples of functions included in the C # library include, for example, functions to connect and disconnect access between the client and the main instrument; to manage safely accessing instrument data and releasing access to such instrument data when the data has been processed; to set, get, and notify changes in instrument settings; to retrieve a Setting Transaction ID (TID) and acquired data transaction ID to allow clients to synchronize data as per settings; to access input waveform sample acquisitions and analysis data from the instrument; and to submit processed data to the instrument for further analysis and visualizations. Of course, other functions to facilitate interaction between the remote access device 200 and the main instrument 30 are also possible, and the above list of functions is not an exhaustive list. Similarly, a Python library 232 provides the same or similar resources for the Python client 230, and a C++ library 242 provides the same or similar resources for the C++ client 240.

The clients 220, 230, 240 couple to an API interface 210, which directly interfaces with a remote interface 82 of the remote access manager 80. In some embodiments the remote interface 82 is an embodiment of an RPC (Remote Procedure Call) server, which functions to accept commands from the API interface 210 and execute them on the instrument 30. For example, a command may be made by the C # client 220 of the remote access device 200 to determine a present state of the instrument 30 and return the present state to the remote access device 200. The remote access device 200 sends the state request to the remote access manager 80 of the instrument 30, which retrieves the present state of the instrument stored in the state client 86, which is continuously updated. Then the remote access manager passes this state information from the state client 86 back to the remote device 200, which, in turn, passes the information to the client 220 that requested the present state, so that the present state information is published to the client for use by the client. Although this example is provided with reference to the C # client 220, the operations perform similarly no matter which client 220, 230, 240 made the initial state request. An example RPC server operating on the remote interface 82 is gRPC, an open-source RPC framework available from Alphabet, Inc. of Menlo Park, California.

Including the API interface 210 in the remote access device 200 provides a layer of abstraction between users of the remote access device 200 and the detailed information that is sent between the remote access device and the instrument 30. Thus, instead of manually coding commands necessary to control the instrument 30, a user may use whatever client is most convenient, be it the C # client 220, Python client 230, and/or the C++ client 240, or others, to interface with the instrument 30 through the API interface 210. Additionally, the API interface 210 provides support for data synchronization between the remote access device 200 and the instrument 30, as described with reference to FIG. 4 below.

It should be noted that communication between the remote access device 200 and the instrument 30 takes place over a high-speed communication interface 150, which could be any wired or wireless communication network. The communication interface may be part of a local network, edge network, or cloud computing network. These networks may use Internet Protocols (IP Protocols), which include relatively large payload capacities as well as a low ratio between overhead data compared to data size. Thus, information and data from the instrument 30, including both state information and data from the instrument itself, is communicated to the remote access device 200 in a very fast manner—much faster than using the SCPI commands described above. Instead of using SCPI commands to interface with the instrument 30, the remote access device 200 uses its own set of commands, in the form of RPC commands, carried over an IP network to transmit data and information across the communication interface 150. The RPC interface uses HTTP/2 (HyperText Transport Protocol 2) and protocol buffers enabling real-time communication. HTTP/2 uses binary framing on the stream that can be prioritized and run via single TCP connection, thus reducing the network utilization and processing load. At runtime, data messages are compressed and serialized in binary format which minimizes the size of the messages. This leads to faster message exchanges using embodiments of the invention than compared to the previously used SCPI commands.

A state of the instrument may be identified by a TransactionID (TID), which identifies information about an active transaction of the instrument 30. The TID may be stored in the state client 86, which makes it available to the remote access device 200, using the techniques described above. In addition, using a TID to identify the state of the instrument 30 allows multiple devices to enable other processes coupled to another process or host/remote machine to connect to the same transaction.

Figure 3:
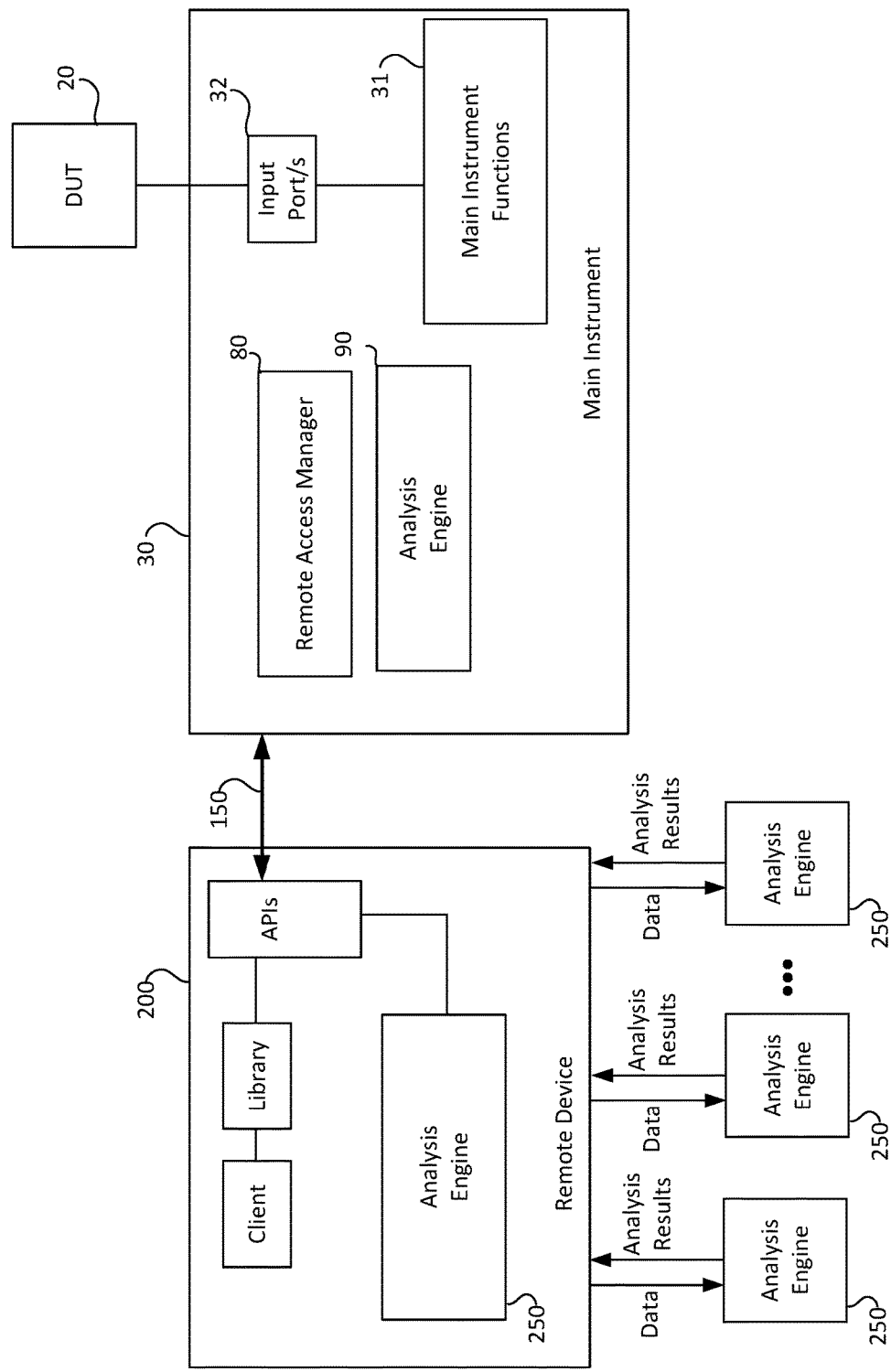
FIG. 3 is a block system diagram illustrating the instrument and remote access devices of FIG. 2, in which the remote access device is coupled to multiple computing resources each including one or more analysis engines, according to embodiments of the disclosure.

The remote access device 200 may also include one or more analysis engines 250. The analysis engine 250 may perform detailed measurements and analysis on data retrieved from the instrument 30. Using an external analysis engine, such as the analysis engine 250, may be beneficial in that it relieves the instrument 30 from performing complex analysis on a stored input waveform while also retrieving subsequent waveforms. Or, as illustrated in FIG. 3, multiple devices coupled to the remote access device 200 may each include their own analysis engine 250, each structured to perform some type of analysis on data extracted from the instrument 30. And, with use of the TID, described above, all of the analysis engines 250 in all of the connected devices may be sure that they are operating on exactly the same set of data retrieved from the instrument 30. Outputs of such analysis engines 250 may then be connected to one another, or compared to one another, to allow a user to analyze data from the instrument in a number of different ways. For example, one analysis engine 250 may perform measurements in the time domain, while another analysis engine performs measurements in the frequency domain. So long as the TID sent with the data to the analysis engine 250 is the same, or is properly managed by the remote device 200, these analysis engines 250 can confirm that they are operating on the same data from the instrument 30, something that is very difficult or impossible to do using present methods. The analysis engines 250 may operate using a local, edge, or cloud computing environment to produce the analyzed results. And different analysis engines 250 may operate on different computing environments. For example, one analysis engine 250 may operate on a local machine, while a separate analysis engine 250 uses resources from a cloud computing environment to perform its analysis. Again, because each analysis engine 250 is operating on the same TID, it is assured that the analysis is performed on the same data extracted from the instrument 30. Another advantage of using multiple analysis engines 250 is to increase throughput of the analysis by simultaneously using separate computing resources to perform each separate analysis using the analysis engines 250. Although not specifically illustrated, each analysis engine 250 includes computing resources and data storage resources, including state storage resources, which allow the analysis engine 250 to perform the desired analysis function requested by the user.

As illustrated in FIGS. 1-3, it is possible that the instrument 30 includes its own analysis engine 90, which operates in the same or similar fashion as described above with reference to the analysis engine 250. In this sense, the analysis engine 90 becomes another computing resource available to the user to analyze information from the instrument 30. In some embodiments the analysis engine 90 may already exist as a built-in function of the instrument 30. The analysis engine 90 includes state storage 96 as well as data storage 98, both of which may be used to perform analysis on the received data.

Figure 4:
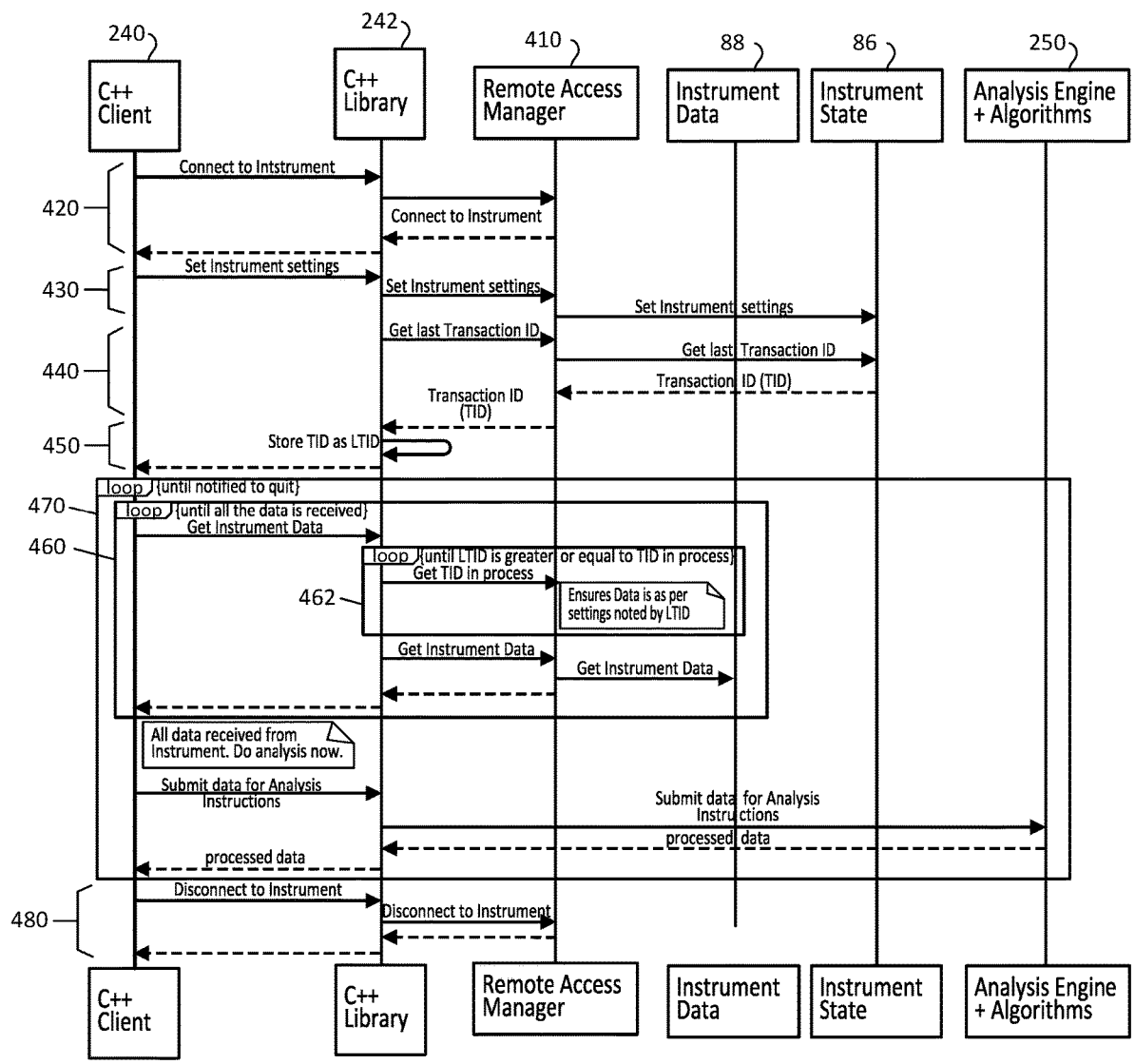
FIG. 4 is a sequence diagram depicting data synchronization with instrument settings and re-targeting the instrument data analysis using a system such as depicted in FIG. 2, according to embodiments of the disclosure.

FIG. 4 is a sequence diagram depicting data synchronization with instrument settings and re-targeting the instrument data analysis using a system such as depicted in FIG. 2, according to embodiments of the disclosure. FIG. 4 illustrates an example using main components of a remote access system described above, including the C++ client 240, C++ library 242, a remote access manager 410, which includes communication functions performed by both the API interface 210 and remote access manager 80, instrument data available through the data client 88, instrument state data available through the state client 86, and one of the analysis engines 250. In embodiments, the process illustrated in FIG. 4 may be used by each separate system coupled to an analysis engine 250 to perform analysis on the same set of data by multiple analysis engines simultaneously.

Referring to FIG. 4, a client application, such as the C++ client 240 initiates an API to the remote access manager 410 to establish a connection between a remote device, such as the remote device 200 of FIG. 2 to the instrument 30. As illustrated, the C++ client 240 may use RPC and API functions stored in the C++ library 242, which may be used to codify the API request and ensure that the API requests are easily used to connect to the remote access manager 410. Although this example is initiated by the C++ client 240, any of the clients 220, 230, 240, or others, may initiate the call to establish the remote connection to the instrument 30.

The remote access manager 410, which as described above includes features from both the API interface 210 and remote access manager 80, establishes the connection between the remote device 200 and the instrument 30 (FIG. 2). Establishing the connection may include a form of security access, such as only connecting to authorized remote devices 200, or from authorized accounts using the C++ client 240.

As illustrated in FIG. 4, an operation 420 requests a communication portal to be opened between the remote device 200 and the instrument 30 using the procedures described above. When the remote access manager 80 on the instrument 30 authorizes the communication portal, it sends the authorization and communication portal details back to the C++ client 240. In this way, the C++ client 240 is allowed to access information from the instrument 30, such as the instrument state and instrument data through the communication portal. In some embodiments, as described above, the remote access manager 410 includes a server operating on the instrument that is developed using gRPC framework to integrate with the instrument to provide high speed access to instrument state and data for external clients through this communication portal.

In an embodiment, the interface mechanism between the C++ client 240 and the remote access manager 410 can set the instrument settings of the instrument 30 by sending commands to the instrument in an operation 430. In response to the request, the remote access manager 410 instructs the state client 86 of the instrument 30 (FIG. 2) to set the instrument 30 to the requested state. Examples of instrument 30 states that may be requested by the C++ client 240 include sampling and trigger settings to configure the acquisition of input signals into sampled waveforms, as well as measurement settings to configure analysis performed on the sampled waveforms.

Further, as illustrated in an operation 440, the C++ client 240, using the C++ library 242, can check the present state of the instrument 30 to determine that the instrument has entered the state requested in the operation 430. In other words, the instrument 30 may not change to the state requested in the operation 430 immediately, as the instrument 30 may be performing other functions necessary to be completed prior to changing to the requested state. Thus, in the operation 440, the C++ client 240 can ensure that the instrument 30 has entered the requested state by receiving a TransactionID (TID), which represents the present state of the instrument 30. By ensuring that the TID matches the state requested in the operation 430, the C++ client 240, or other function in the remote device 200, may be assured that the requested state matches the present state of the instrument 30, and that the instrument has, in fact, entered the requested state. Then the C++ client 240 stores the TID retrieved as described above as a Local TID (LTID), which is illustrated in operation 450.

After the state of the instrument has been established, and confirmed, the C++ client 240 may begin to request data from the instrument 30, as represented by a loop operation 460 in FIG. 4. In the loop 460, the data from the instrument 30 is retrieved from the data client 88 and sent back to the remote access device 200. A sub-operation 462 continuously compares the LTID, which is stored in the remote access device 200 to the instantaneous state of the instrument 30 as the data is being retrieved, which is represented by the TID. Ensuring the LTID matches the instantaneous TID confirms that the instrument 30 has not changed states while data is being retrieved in the operation 460. In some embodiments the data retrieved from the instrument 30 using the operation 460 is tagged with the LTID, which provides a further assurance that the data retrieved from the instrument 30 is accurate.

Thus, in these operations 430-460, the interface mechanism between the remote device 200 and instrument 30 allows the remote device to query the instrument data after setting the instrument in the desired state, and also allows the remote device to acquire the instrument data from the instrument 30 with no misses in the acquired data. Plus, by ensuring the LTID matches the TID, it is assured that the instrument 30 has not changed states during the retrieval of the data.

After the data has been retrieved from the instrument 30, using the techniques described above, such data may be used by the analysis engine 250 of the remote device 200. As described above, the analysis engine 250 may perform any measuring or analysis function that may also be performed by the instrument 30, or others, such as measuring aspects of the input signal used to create the waveform sample, analysing the data in time or frequency domains, creating histograms, eyecharts, etc. of the analysed data, or performing other functions. And, also as described above, the remote device 200 may send the retrieved data, which has been ensured to be correct, to more than one analysis engine 250, each located on separate computing devices. Then all of the analysis from all of the analysis engines 250 may be compiled, co-located, aggregated, or otherwise assembled so that many aspects of the signal originally acquired from the DUT 20 (FIG. 2) can be analysed. Plus, distributing multiple analysis engines 250 across many different computing resources allows the data to be analysed in parallel fashion, so that any particular machine, or network is not overloaded by performing the analysis. And, since the data retrieved from the instrument 30 is retrieved under, or even tagged with, the same TID, it is assured that all of the analysis engines 250 are operating on exactly the same data.

An example of sending the retrieved data to an analysis engine 250 is illustrated in FIG. 4 by loop operation 470. In this operation 470, the data acquired from the instrument 30 is sent to an analysis engine 250 to perform analysis on the data, as described above. Then, the analysis engine 250 sends back to the remote device 200 results of the analysis. These results may be in the form of display data, such as waveform displays, displays in the frequency domain, power spectrum displays, modulation measurements, eye charts, phase and jitter measurements, vector displays, frequency and phase measurements, noise and gain measurements, etc. In general, each of the analysis engines 250 may be operated to perform any type of analysis typically found on test and measurement devices for testing and measuring signals acquired from a DUT. Although FIG. 4 shows the data retrieved from the instrument 30 being sent to only a single analysis engine 250, as described above, copies of the retrieved data may be sent to multiple analysis engines 250. Any particular analysis engine 250 may operate on the data at any time and send its analysis results back to the remote device 200, or other device (even the instrument 30, where it may be analysed by analysis engine 90 (FIG. 2)). Then, all of the analysis performed by all of the separate analysis engines 250 may be sent back to the remote device 200, or other device, and compiled so that outputs from the various analysis engines 250 may be indexed to the same timestamp or trigger, and easily compared to one another to assist the user in analysing the data from the waveform signal originally acquired by the instrument 30. Such a process allows a user to perform complex analysis, perhaps using multiple separate devices, yet ensuring that all of the analysis is performed on exactly the same data acquired by the instrument 30.

Also, the analysis performed by the individual analysis engines 250 may be spread over multiple computing resources, including local networks, edge networks, and cloud computing networks. By spreading the analysis functions of the analysis engines 250 across multiple computing resources, the user can fanout complex data analysis with no change in data for the instrument state until the analysis has been completed. For example, the interface mechanism described above allows the client to request the instrument data through the client libraries to receive the TID which is currently executing.

After the data retrieved from the instrument 30 has been received by the remote device 200, the remote device can disconnect from the instrument, closing the communication portal, as illustrated by an operation 480 in FIG. 4. Although in FIG. 4 this disconnection operation 480 is illustrated as occurring after the data has been sent for analysis in the operation 460, it is not strictly necessary that the retrieved data is sent for analysis prior to disconnecting. In other embodiments the remote device 200 may merely store the information for later processing, by itself or other devices. In other embodiments the remote device 200 may acquire multiple different data samples, by instructing the instrument 30 to acquire a series of data samples, each of which is individually stored by the remote device. Then, after all of the samples have been acquired, they may be sent to various analysis engines 250 for analysis, as described above. Since each separate data sample is associated with a unique TID, it can be assured that analysis is being performed on the same sample, even when it is operated by multiple, various analysis engines 250, and even when the sample is analyzed at a time later than when it was retrieved from the instrument 30.

Although the above description with reference to FIG. 4 described an example where a remote device 200 retrieved data that was acquired by the main instrument for external analysis, performed on another device separate from the instrument, embodiments of the invention may also use the analysis and visualization features of the instrument, or multiple instruments, to perform such analysis and visualization on data acquired from another device or instrument. In such an example, after the remote device 200 couples to the main instrument 30, as described above, the remote device first sends a copy of data to the main instrument to be stored in the main instrument. Differently than the embodiment described above, this data to be analyzed was not acquired by the main instrument 30, but may have been acquired by another instrument, or another type of device. For example, a remote device 200 may provide a set of data to be analyzed and visualized by four different main instruments 30, each set up to analyze a different aspect of the same data to be analyzed, such as an input waveform. In this way, the remote device 200 first connects with each of the four main instruments 30, and then stores the same input waveform in each of the four main instruments using the protocols described above. Then the remote device 200 sends a command for each main instrument 30 to perform its individual analysis on the input waveform stored within each device and generate a visualization on each main instrument that shows the specific analysis for each individual main instrument. These visualizations may then further be compiled or otherwise assembled into a final output so that the user of the remote device 200 can see all of the visualizations operating simultaneously. Using embodiments of the invention allows the coordination that makes such parallel analysis using multiple instruments possible.

The foregoing description of the invention has been set merely to illustrate the invention and is not intended to be limiting. Since modifications of the disclosed embodiments incorporating the substance of the invention may occur to person skilled in the art, the invention should be construed to include everything within the scope of the invention.

EXAMPLES

Illustrative examples of the technologies disclosed herein are provided below. A configuration of the technologies may include any one or more, and any combination of, the examples described below.

Example 1 is a test and measurement system, including an instrument having an input port structured to receive an input signal from a Device Under Test (DUT), a memory structured to store data derived from the input signal, a remote access manager, and an instrument state manager structured to maintain a present operating state of the instrument, a communication network through which the instrument may be coupled to a remote device, and the remote device structured to receive through the communication network at least a portion of the stored data derived from the input signal from the instrument, and further structured to receive a transaction identifier that identifies the present operating state of the instrument when the portion of the stored data was acquired by the instrument.

Example 2 is a test and measurement instrument according to Example 1, in which the remote device is further structured to control a state of the instrument by sending a command through the communication network.

Example 3 is a test and measurement instrument according to any of the preceding Examples, in which the remote access manager is structured to operate using Remote Procedure Calls (RPCs) received from the remote device.

Example 4 is a test and measurement instrument according to any of the preceding Examples, in which the communication network uses an Internet Protocol.

Example 5 is a test and measurement instrument according to any of the preceding Examples, in which the remote device further comprises an analysis engine structured to perform analysis on the portion of the stored data that was acquired by the instrument.

Example 6 is a test and measurement instrument according to any of the preceding Examples, in which the remote device is structured to send the portion of the stored data that was acquired by the instrument to one or more analysis engines.

Example 7 is a test and measurement instrument according to Example 6, in which the one or more analysis engines each operate on a different computing resource.

Example 8 is a test and measurement instrument according to Example 7, in which at least one of the computing resources is a local network, an edge network, or a cloud network.

Example 9 is a test and measurement instrument according to any of Examples 6-8, in which the remote device is further structured to send a transaction identifier to the one or more analysis engines.

Example 10 is a remote device for coupling to a test and measurement instrument, the remote device including an application program interface structured to receive a command generated on the remote device and send a command to the test and measurement instrument to open a communication channel with the test and measurement instrument, the application program interface further structured to send a command to the test and measurement instrument that requests a present state of the instrument, storage configured to store the present state of the instrument on the remote device, the application program interface further structured to receive data from the test and measurement instrument, and to receive an updated present state of the instrument that identifies the state of the instrument when the data was received by the remote device, and a comparator structured to compare the stored state of the instrument to the updated present state of the instrument.

Example 11 is a remote interface according to Example 10, further comprising an analysis engine structured to perform analysis on at least a portion of the data that was received from the test and measurement instrument.

Example 12 is a remote interface according to Examples 10 or 11, further comprising a sending module structured to send the received data and a transaction identifier representing the state of the instrument when the data was received by the remote device.

Example 13 is a method, of operating a test and measurement system, the method including receiving, at a measurement instrument, an input signal from a Device Under Test (DUT), storing data derived from the input signal, storing a transaction identifier that indicates a state of the measurement instrument at the time the data derived from the input signal was stored, after receiving, at the measurement instrument, a request from a remote device, sending at least some of the stored data to the remote device, and sending the transaction identifier to the remote device.

Example 14 is a method according to Example 13, further comprising receiving, at the measurement instrument, a request from the remote device to open a communication channel; and opening the communication channel with the remote device.

Example 15 is a method according to Example 14, in which receiving the request from the remote device comprises receiving a Remote Procedure Call.

Example 16 is a method according to any preceding Example method, further comprising performing analysis on the at least some of the stored data at the remote device.

Example 17 is a method according to any preceding Example method, further comprising sending the at least some of the stored data to an external device.

Example 18 is a method according to Example 17, further comprising sending the transaction identifier to the external device.

Example 19 is a method according to any preceding Example method, further comprising sending the at least some of the stored data and the transaction identifier to two or more external devices.

The previously described versions of the disclosed subject matter have many advantages that were either described or would be apparent to a person of ordinary skill. Even so, these advantages or features are not required in all versions of the disclosed apparatus, systems, or methods.

Persons skilled in the art will appreciate that elements in the figure(s) are illustrated for simplicity and clarity and may have not been drawn to scale. For example, it will be appreciated that any flow charts, flow diagrams, and the like represent various processes which may be substantially represented in computer readable medium and so executed by a computer or processor, whether or not such computer or processor is explicitly shown. Furthermore, the various processes and operations may be performed in any order, unless it is specifically described that one operation precedes a subsequent operation or the context excludes those possibilities. Throughout the drawings, it should be noted that like reference numbers are used to depict the same or similar elements, features, and structures.

The terms and words used in the following description are not limited to the bibliographical meanings, but are merely used herein to enable a clear and consistent understanding of embodiments of the invention. Accordingly, it should be apparent to those skilled in the art that the description of exemplary embodiments is provided for illustration purpose only and not for the purpose of limiting the invention and their equivalents.

It is to be understood that the singular forms "a," "an," and "the" include plural referents unless the context clearly dictates otherwise.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Although specific examples of the invention have been illustrated and described for purposes of illustration, it will be understood that various modifications may be made without departing from the spirit and scope of the invention. Accordingly, the invention should not be limited except as by the appended claims.

We claim:

1. A test and measurement system, comprising:
   an instrument including:
   a remote access manager; and an instrument state manager structured to generate a state transaction identifier corresponding a present operating state of the instrument;

a communication network; and a remote device structured to be coupled to the instrument through the communication network, the remote device further structured to:

receive the state transaction identifier from the instrument through the communication network;

receive, through the communication network, data from the instrument and a data transaction identifier corresponding to the data from the instrument; and determine whether the data transaction identifier matches or is higher than the state transaction identifier.

2. The test and measurement system according to claim 1, in which the remote device is further structured to control the present operating state of the instrument by sending a command through the communication network.

3. The test and measurement system according to claim 1, in which the remote access manager is structured to operate using Remote Procedure Calls (RPCs) received from the remote device.

4. The test and measurement system according to claim 1, in which the communication network uses an Internet Protocol.

5. The test and measurement system according to claim 1, in which the remote device further comprises an analysis engine structured to perform analysis on the data from the instrument.

6. The test and measurement system according to claim 1, in which the remote device is structured to send the data from the instrument to one or more analysis engines.

7. The test and measurement system according to claim 6, in which the one or more analysis engines each operate on a different computing resource.

8. The test and measurement system according to claim 7, in which at least one of the computing resources is a local network, an edge network, or a cloud network.

9. The test and measurement system according to claim 6, in which the remote device is further structured to send a transaction identifier to the one or more analysis engines.

10. The test and measurement system according to claim 1, in which the instrument state manager is further structured to continuously update the present operating state of the instrument.

11. A remote device for coupling to a test and measurement instrument, the remote device comprising:

storage configured to store a present state of the test and measurement instrument;

an application program interface structured to:

send a command to the test and measurement instrument that requests a state transaction identifier corresponding to the present state of the test and measurement instrument;

receive data from the test and measurement instrument; and receive a data transaction identifier that identifies the present state of the test and measurement instrument when the data was received by the remote device; and a comparator structured to compare the state transaction identifier to the data transaction identifier for a same or greater value between the state transaction identifier and the data transaction identifier.

12. The remote device according to claim 11, further comprising an analysis engine structured to perform analysis on at least a portion of the data that was received from the test and measurement instrument.

13. The remote device according to claim 11, further comprising a sending module structured to send the received data and a transaction identifier representing the present state of the test and measurement instrument when the data was received by the remote device.

14. A method of operating a test and measurement system, the method comprising:

configuring a test and measurement instrument with one or more settings as instructed by a remote device;

generating a state transaction identifier in a test and measurement instrument, the state transaction identifier corresponding to the one or more settings configured on the test and measurement instrument;

sending the state transaction identifier to the test and measurement instrument;

receiving, at the test and measurement instrument, an input signal from a Device Under Test (DUT);

storing data derived from the input signal;

storing a data transaction identifier that indicates a state of the test and measurement instrument at a time the data derived from the input signal was stored;

after receiving, at the test and measurement instrument, a request from a remote device:

sending at least some of the stored data to the remote device; and sending the data transaction identifier to the remote device.

15. The method according to claim 14, further comprising:

receiving, at the test and measurement instrument, a request from the remote device to open a communication channel; and opening the communication channel with the remote device.

16. The method according to claim 15, in which receiving the request from the remote device comprises receiving a Remote Procedure Call.

17. The method according to claim 14, further comprising performing analysis on the at least some of the stored data at the remote device.

18. The method according to claim 14, further comprising sending the at least some of the stored data to an external device.

19. The method according to claim 18, further comprising sending the data transaction identifier to the external device.

20. A method of operating a test and measurement system, the method comprising:

receiving, at a measurement instrument, an input signal from a Device Under Test (DUT);

storing data derived from the input signal;

storing a transaction identifier that indicates a state of the measurement instrument at a time the data derived from the input signal was stored;

after receiving, at the measurement instrument, a request from a remote device:

sending at least some of the stored data to the remote device, and sending the transaction identifier to the remote device; and sending the at least some of the stored data and the transaction identifier to two or more external devices.

* * * * *